United States Patent
Papageorgiou

(10) Patent No.: US 8,495,447 B2
(45) Date of Patent: Jul. 23, 2013

(54) DATA PROCESSING IN SIGNAL TRANSMISSIONS

(75) Inventor: Andrew Papageorgiou, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 861 days.

(21) Appl. No.: 12/517,841

(22) PCT Filed: Nov. 26, 2007

(86) PCT No.: PCT/GB2007/004514
§ 371 (c)(1),
(2), (4) Date: Oct. 22, 2009

(87) PCT Pub. No.: WO2008/068461
PCT Pub. Date: Jun. 12, 2008

(65) Prior Publication Data
US 2011/0022915 A1    Jan. 27, 2011

(30) Foreign Application Priority Data
Dec. 8, 2006 (GB) .................................. 0624572.4

(51) Int. Cl.
*G06F 11/00* (2006.01)
(52) U.S. Cl.
USPC ............ 714/748; 341/155; 714/758; 714/794
(58) Field of Classification Search
None
See application file for complete search history.

(56) References Cited

U.S. PATENT DOCUMENTS

| | | | |
|---|---|---|---|
| 2002/0062468 A1 | 5/2002 | Nagase et al. | |
| 2002/0166095 A1* | 11/2002 | Lavi et al. | 714/786 |
| 2003/0023917 A1 | 1/2003 | Richardson et al. | |
| 2004/0235190 A1 | 11/2004 | Bellemare | |
| 2005/0185740 A1 | 8/2005 | Li | |
| 2005/0235190 A1* | 10/2005 | Miyazaki et al. | 714/748 |
| 2006/0107165 A1 | 5/2006 | Murata et al. | |
| 2006/0261992 A1* | 11/2006 | Lusky et al. | 341/155 |

FOREIGN PATENT DOCUMENTS

| | | |
|---|---|---|
| EP | 1 028 420 A2 | 8/2000 |
| EP | 1 193 881 A2 | 4/2002 |
| EP | 1 628 428 A1 | 2/2006 |
| EP | 1 653 648 A2 | 5/2006 |

(Continued)

OTHER PUBLICATIONS

Benelli, "An efficient ARQ technique with memory," Alta Frequenza, Ufficio Centrale AEI-CEI, Jul. 4, 1984, pp. 206-212, vol. 53, No. 4, Milano, Italy.

(Continued)

*Primary Examiner* — Scott Baderman
*Assistant Examiner* — Jason Bryan
(74) *Attorney, Agent, or Firm* — Novak Druce Connolly Bove + Quigg LLP; Vincent M DeLuca

(57) ABSTRACT

A controller for a communications device, comprising: a receiver arranged for receiving a first data block and a second data block, each data block comprising a plurality of analogue signals; a digitizer arranged for converting each analogue signal into a digital value and marking each digital value as saturated when the digital value exceeds a digital range; and a processor arranged for modifying at least one digital value of the first block by combination with a corresponding digital value of the second block except where the digital value of the first block is marked as saturated and marking each modified value as saturated when the modified value is outside a defined range.

24 Claims, 3 Drawing Sheets

FOREIGN PATENT DOCUMENTS

| | | |
|---|---|---|
| JP | 61-100826 A | 5/1986 |
| JP | 6-29951 A | 2/1994 |
| JP | 2001-230681 A | 8/2001 |
| JP | 2005-506733 A | 3/2005 |
| JP | 2005-260585 A | 9/2005 |
| WO | 2004/088852 A1 | 10/2004 |
| WO | 2004/107639 A1 | 12/2004 |
| WO | 2005/041469 A1 | 5/2005 |

OTHER PUBLICATIONS

The extended European Search Report dated Jan. 22, 2013, in corresponding EP patent application.

* cited by examiner

DATA PROCESSING IN SIGNAL TRANSMISSIONS

FIELD OF THE INVENTION

The present invention is related to a method and apparatus for processing data in signal transmissions. The invention is particularly but not exclusively directed towards data processing using a HARQ (Hybrid Automatic Repeat reQuest) protocol with multiple transmissions followed by decoding with a turbo decoder.

BACKGROUND

There are many systems which communicate data using signal transmissions, such as telephone, satellite, and cellular systems, whether wired or wireless. During transmission, interference, also called noise, can corrupt the signal. This occurrence is particularly prevalent in wireless transmissions.

Various techniques have been implemented to ensure data transmitted over signal communication systems can be received free from transmission errors. Such techniques include encoding the data by adding redundant information into the signal transmission. A popular encoding technique is turbo encoding/decoding.

A turbo encoder generates a first set of parity bits for the data—computed using a convolutional code—and a second set of parity bits for a known permutation of the data—also computed using a convolutional code. A block combined of the two parity sets and the data is then transmitted.

The receiver generates an integer for each bit in the data stream reflecting the strength of the received signal for that bit. The integer is a measure of how likely it is that the bit is a 0 or 1. To decode the block of data a turbo decoder uses two parallel decoders, one for each of the parity sets. Each parallel decoder uses the likelihood data as a start point and feeds its results into the other to strengthen the hypothesis of the likelihood of each bit of the data being 0 or 1. After sufficient iterations a block is "decoded".

However, sometimes significant interference can result in a data block that is deemed to be decoded but still contains a transmission error.

To catch this error and ensure correct transmission of the data block a technique called a HARQ protocol may be combined with the turbo decoder. Using the HARQ protocol, the received block is stored in a HARQ buffer. The block is then processed by the turbo decoder. At the end of the turbo decoding process the data block is CRC-tested (CRC=Cyclic Redundancy Check). If the data block fails this test, the system implementing the HARQ protocol requests retransmission of the whole or part of the block. The values of the bits that are known to be the same in both the first block and the second, retransmitted, block are added together. The resultant block is reprocessed by the turbo decoder. The process of requesting retransmission of the block is repeated until a successful CRC check is obtained, or too many attempts have been made.

To request retransmission, the HARQ protocol can use Chase combining—where the entire block is retransmitted—or incremental redundancy—where a sub-set of bits from the block is transmitted.

There are two existing methods of processing the first block and the second, retransmitted, block.

The first method utilises saturation of values. If the value of the signal for a bit of the block is outside a fixed integer range (for example, between +32 and −32) the value is saturated and only the highest/lowest value of the integer range is recorded. When the second block is received the value of the signal is added to the stored value. If the two combined values are outside the integer range the highest\lowest value of the range is recorded.

The disadvantage of this approach is that if the signal of the first block was strong and the signal of the second block is weak and incorrect, the combined value for the bit may end up being weak which could affect effective decoding by the turbo decoder.

This problem is alleviated by using a larger integer range to store the values for each bit. Unfortunately the side-effect of this is that the HARQ buffer then occupies more memory. Memory usage can be of concern in communications devices, particularly in mobile communications devices.

The second method uses block floating point to store the values. The strength of the bit from the received signal is stored as a floating point number with a portion representing the significance and a portion representing the exponent.

When the second block is received the value of the signal is converted to block floating point and added to the stored value.

The disadvantage with this approach is that floating point values are unsuitable for use by turbo decoders because turbo decoders are most concerned with bits that are on the threshold between one and zero. Floating point representations of data only keep the most significant information of the value of the bit and lose the resolution of values which are close to zero in the integer range.

It is object of the present invention to provide a method for processing data in signal transmissions which maintains the resolution of data for subsequent decoding and reduces memory usage, or at least provides a useful alternative.

SUMMARY OF THE INVENTION

According to a first aspect of the invention there is provided a controller for a communications device, comprising:
  a receiver arranged for receiving a data block comprising a plurality of analogue signals; and
  a digitizer arranged for converting each analogue signal into a digital value and marking each digital value as saturated when the digital value is outside a defined digital range.

It is preferred that the digital value is marked as saturated when the digital value is outside the defined digital range by a defined threshold.

Each analogue signal may represent the strength of a received bit.

Preferably, the controller includes a memory arranged for storing the digitized data block into a buffer.

The digital values may be integer values.

The digital value may be marked as saturated by setting a saturation flag assigned to the digital value. Alternatively, the digital value may be marked as saturated by assigning the digital value beyond the limit of the digital range.

It is preferred that the controller includes a decoder arranged for decoding the digitized data block. The decoder may use likelihood values to decode a data block. The decoder may be a turbo decoder.

Preferably, the controller includes a verification unit arranged for verifying a decoded data block. The verification unit may utilise a CRC verification method. The receiver may be further arranged for transmitting a request for retransmission of the block if the verification unit fails the decoded data block and for receiving the retransmitted block. The digitizer may be further arranged for processing the received retransmitted block.

According to a further aspect of the invention there is provided a controller for a communications device, comprising:

a processor arranged for receiving a first data block and a second data block, each data block comprising a plurality of values, modifying at least one value of the first block by combination with a corresponding value of the second block except when the value of the first block is marked as saturated and marking each modified value as saturated when the modified value is outside a defined range.

It is preferred that the modified value is marked as saturated when the modified value is outside the defined range by a defined threshold.

The values may be digital values.

The controller may include a receiver arranged for receiving the first and second data block in analogue form such that the first and second block comprises a plurality of analogue signals.

The controller preferably includes a memory for storing the first block in a buffer. The memory may be further arranged for storing the modified first block in the buffer.

It is preferred that the first data block is received before the second data block by the receiver.

The controller preferably includes a digitizer arranged for converting each analogue signal into a digital value and marking each digital value as saturated when the digital value is outside a defined digital range. The digital value may be marked as saturated when the digital value is outside the defined digital range by a defined threshold. The defined range and the defined digital range may be the same, and the defined threshold and the defined digital threshold may also be the same.

The controller preferably includes a decoder arranged for decoding the modified first block. The decoder may utilise likelihood values to decode a data block. The decoder may be a turbo decoder. It is preferred that the controller also includes a verification unit arranged for verifying the decoded modified first block. The verification unit may utilise a CRC verification method.

It is preferred that each block is received from a separate transmission of the same data block.

The decoder may be further arranged for decoding the first block.

When the controller includes a verification unit, the verification unit may be further arranged for verifying the decoded first block. The controller may include a transmitter arranged for transmitting a request for retransmission of the first block when the verification unit fails verification of the decoded first block. The second block may be transmitted by a transmitting entity to the receiver in response to the request for retransmission of the first block.

The value may be marked as saturated by setting a saturation flag assigned to the value. Alternatively, the value may be marked as saturated by assigning the value beyond the limit of the range.

According to a further aspect of the invention there is provided a method of processing a data block, comprising a plurality of analogue signals, including the steps of:
(i) converting each analogue signal into a digital value; and
(ii) marking each digital value as saturated when the digital value is outside a defined digital range.

According to a further aspect of the invention there is provided a method of processing a first data block and a second data block, each data block comprising a plurality of values, including the steps of:

(i) modifying at least one value of the first block by combination with a corresponding value of the second block except when the value of the first block is marked as saturated; and
(ii) marking each modified value as saturated when the combination of the modified value is outside a defined range.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a system for processing data received via signal transmissions to ensure error-free reception of the data. The system receives data in a block transmitted over an analogue signal and digitizes the block. During digitization voltages of the analogue signal for each bit in the block that are beyond the digital range are marked as saturated. Blocks are processed and a request for retransmission is sent for those that fail verification. Re-sent blocks are combined with the originally received block to improve the quality of the block. Bits that are marked as saturated in the blocks are not modified during the combination process to avoid degrading bits that have been strongly received.

Figure 1:
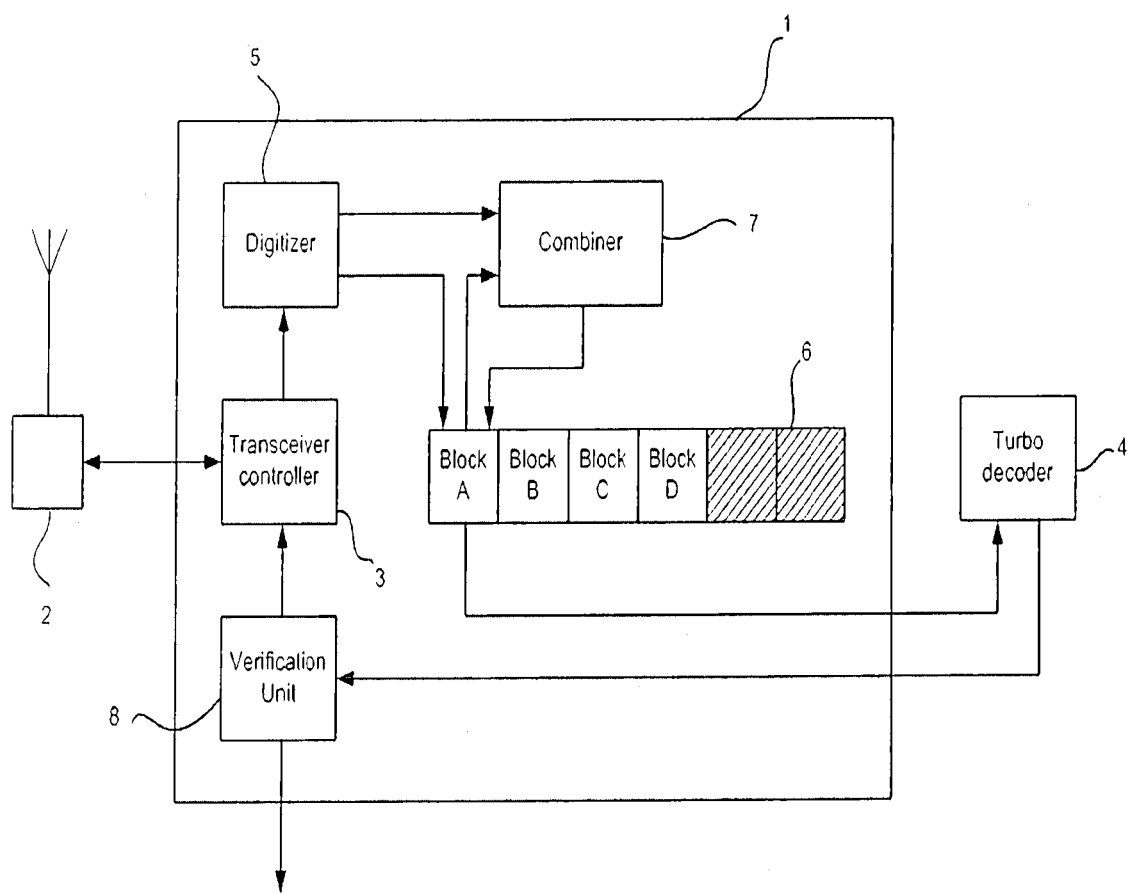
FIG. 1: shows a schematic diagram illustrating a processing system for data received in blocks via signal transmission.

FIG. 1 shows a system 1 for processing data received over signal transmissions from a transceiver 2. The system includes a transceiver controller 3 connected to a transceiver 2. The system is connected to a turbo decoder 4. The system includes a digitizer 5 connected to the transceiver controller 3, and a buffer 6 connected to the digitizer 5. The system 1 also includes a combiner 7 connected to the digitizer 5 and the buffer 6. The system includes a verification unit 8 connected to the turbo decoder 4 and the transceiver controller 3.

The transceiver 2 receives signals from a transmitting entity.

The buffer 6 can be implemented using a memory such as RAM.

The digitizer 5, combiner 7, verification unit 8, and turbo decoder 4 can be implemented using a processor.

The transceiver controller 3 extracts data transmissions from the transceiver 2 in the form of blocks of data. Each block comprises a number of bits. Each bit is represented in the block in the form of an analogue value of the strength of the signal for the bit (for example, a voltage of 1.3V).

The digitizer 5 converts the received data transmissions from the analogue signal for each bit for the block into an integer representing the strength of the received bit. It will be appreciated that the bit strengths could also be converted into a digital representation other than integer form, such as floating point form.

The digitized blocks (for example A, B, C, and D) are stored in the buffer 6.

The received data blocks have been encoded using a turbo encoder at the transmitting entity. Each encoded block includes two parity sub-blocks. The system 1 utilises the turbo decoder 4 to decode blocks. The turbo decoder 4 operates using methods known to those skilled in the art.

It will be appreciated that the use of other decoders can be conceived.

The invention is particularly advantageous for decoders which operate on bit likelihoods such as turbo decoders.

The verification unit 8 performs a CRC check on blocks "decoded" by the turbo decoder 4 and, if necessary, requests the retransmission of a block. The verification unit 8 uses a CRC code which has been calculated and embedded in the block by the transmitting entity. The use of verification methods other than CRC can be conceived.

The combiner 7 implements a Chase combiner which combines a retransmitted copy of a block with the existing copy of the block for reprocessing by the turbo decoder. The Chase combiner functions by combining the strengths of corresponding bits from each block. For example, if the strength of the existing bit is 4 and the strength of the corresponding bit for the retransmitted block is 3, the strength of the combined bit is 7.

In alternative embodiment the combiner 7 implements an incremental redundancy method where only a sub-set of the bits of the block have been retransmitted and are used to modify the existing copy of the block.

Figure 2:
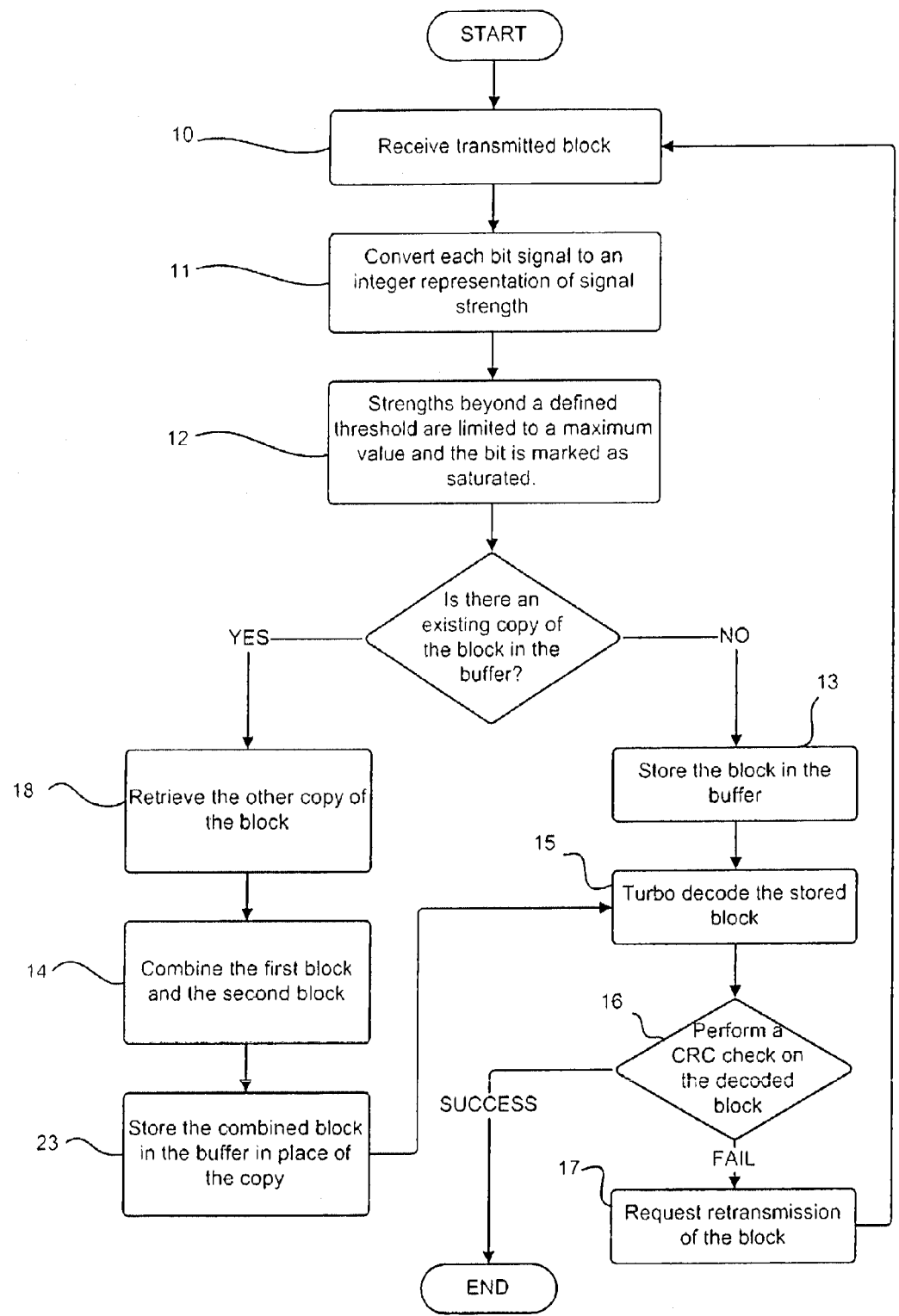
FIG. 2: shows a flowchart illustrating a method for processing the blocks in accordance with the invention.

A method of the invention will now be described with reference to FIGS. 1 and 2.

The transceiver controller 3 receives a transmitted block received by a transceiver in step 10.

The block is processed in step 11 by the digitizer 5 which digitizes the signals for each bit into an integer within a defined integer range. A threshold is predefined for the system. When the strength of the bit is outside the integer range by the predefined threshold the bit is marked as saturated by setting true a saturated flag for the bit in step 12.

For example, if the integer range for the bit is from +31 to −31 and the threshold is 8 beyond the integer range then where the strength of the bit is less than −40 or greater than +40, the saturated flag for the bit is set to true.

In an alternative embodiment the value is marked as saturated by setting the bit value above or below the integer range. For example, with an integer range of +30 to −30, if the strength of the bit is +50, the bit value is set to +31.

In one embodiment there is no threshold and the bit is marked as saturated when the bit strength is outside the integer range.

A possible advantage of using a threshold is that only strongly received bits are marked as saturated. This may reduce the chance that an incorrectly received bit is set to saturated.

Once the block has been digitized it is stored 13 in the buffer 6 unless a copy of the block has been previously received in which case the two blocks will be combined 14 in accordance with a combining method which will be described later.

The turbo decoder 4 extracts the stored block and performs turbo decoding on it to produce a "decoded" block in step 15.

The CRC verification unit 8 processes in step 16 the block to determine if it is free of transmission errors.

If the block fails this test a request for retransmission in step 17 is sent to the transmitting entity by the transceiver controller 3 via the transceiver 2.

The retransmitted block is received and processed by the digitizer 5. The originally received block is extracted from the buffer 6 in step 18 and the combiner 7 modifies the originally received block by combining it with the retransmitted block in step 14.

Figure 3:
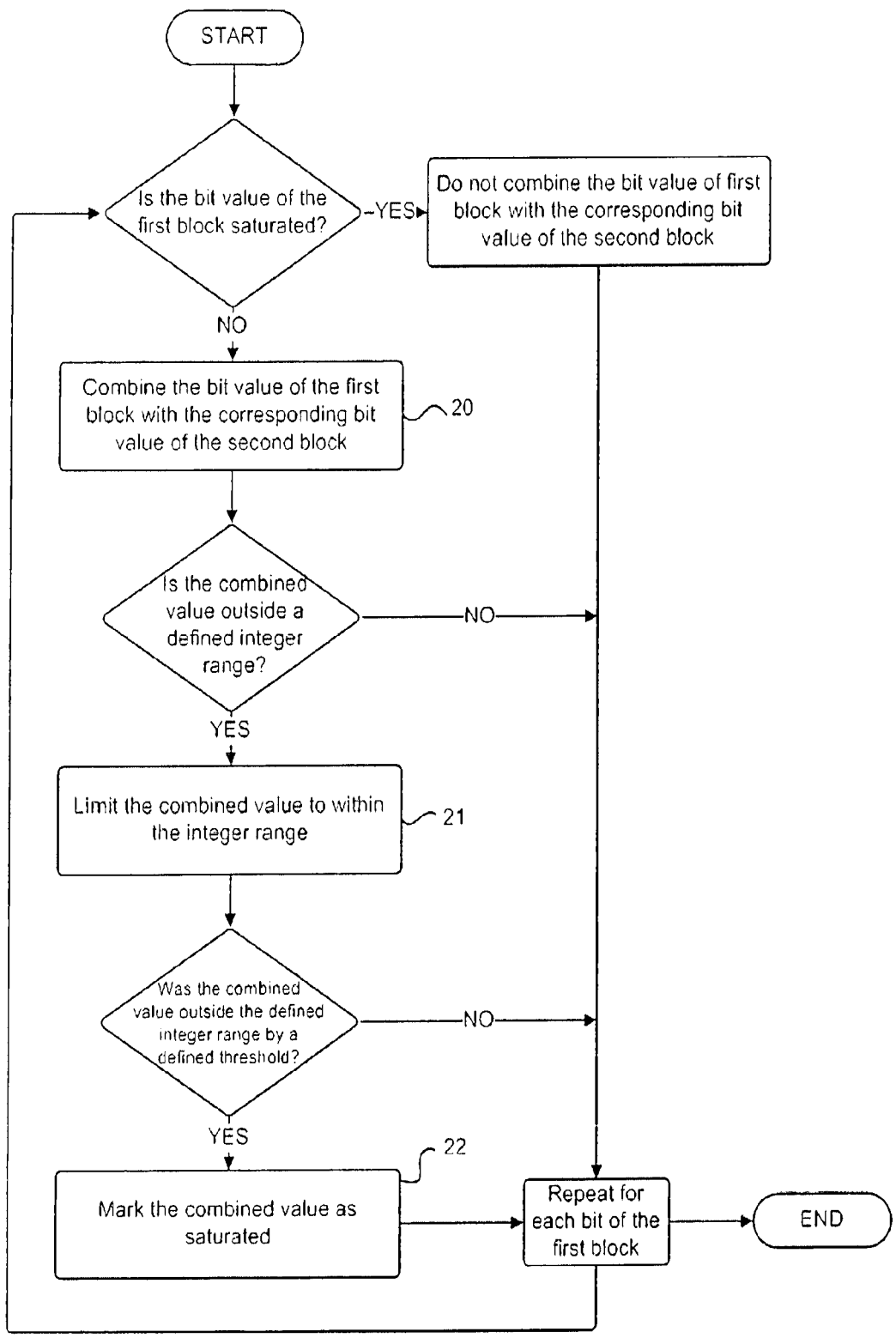
FIG. 3: shows a flowchart illustrating a method for combining two blocks in accordance with the invention.

The method of modifying the original block (first block) by combination with the retransmitted block (second block) will now be described with reference to FIG. 3.

The blocks are processed on a bit value by bit value basis.

If incremental redundancy is being used only those bits within the first block that have corresponding bits in the sub-set of bits comprising the second block will be processed.

If the bit value of the first block is marked as saturated then this bit value is not modified and the process skips to the next bit.

In an alternative embodiment of the invention if the bit value of either the first or second block is marked as saturated, then no modification is made to the bit value and the process skips to the next bit.

If the bit value is not marked as saturated then the two values are combined in step 20 by adding the value of second bit to the value of the first bit.

If the combined value exceeds an integer range, then the combined value is restricted to the integer range in step 21. For example, if the range is +31 to −31, and the combination of the first value and second value is +38 then the combined value would be +31.

If the combined value exceeded the integer range by a predefined threshold then the combined bit is marked as saturated in step 22. For example, if the threshold is 8 and the range is +31 to −31, and the combination of the first and second value was +41, then the combined bit is marked as saturated. The predefined threshold may be the same threshold as used by the digitizer 5.

The modified first block replaces the original block stored within the buffer 6 in step 23.

Once the first block has been modified by the second block, the turbo decoder 6 once again attempts to decode the block, and the CRC verification unit 8 processes the "decoded" block. The process of requesting retransmission is repeated until the CRC verification unit 8 returns a success check or a defined number of attempts have been made. If the number of attempts has been exceeded the system can conclude that the transmission channel is too corrupt to be used for data transmission.

It will be appreciated that with minor modifications the present invention may be adapted for use with alternative retransmitting methods.

Taking as an example a situation where data comprising "101" is attempted to be transmitted and the digital range of the system is +10 to −10 with a threshold of 3, so that bit values outside +13 to −13 are marked as saturated ("S"). The steps that are performed could be as follows:

1) The transmitting entity generates the CRC value "1" for the block.
2) The transmitting entity generates an encoded data block which is the data "101" concatenated with the CRC value "1" concatenated with two parity sub-blocks "10" and "01" created by a turbo encoder.
3) The resulting block—"101 1 10 01" is transmitted by the transmitting entity.
4) The block is received by the system as analogue strengths for each bit —"0.4V, 0.1V, 1.5V, 1.1V, −0.3V, −1.5V, −1.2V, 1.0V".
5) The analogue block is digitized—"+4, +1, +15, +11, −3, −15, −12, 10".
6) Bits 3 and 6 are outside +13 to −13 therefore they are marked as saturated—"X X S X X S X X".
7) The digital values for the block are restricted to the digital range—"4, 1, 10, 10, −3, −10, −10, 10".
8) The block is decoded by a turbo decoder as "111".
9) The CRC value for this block is "0". Therefore the block fails the CRC check. A request for retransmission is made by the system to the transmitting entity.
10) The block is retransmitted by the transmitting entity.

11) The retransmitted block is received as —"0.8V, −0.5V, −0.5V, 0.5V, −1.0V, −0.2V, 0.2V, 1.0V".
12) The retransmitted block is digitized—"+8, −5, −5, 5, −12, −2, 2, 10".
13) The digital values for the retransmitted block are restricted to the digital range—"8, −5, −5, 5, −10, −2, 2, 10".
14) The digital values of the first block are modified by adding the digital values of the second block, except for bits 3 and 6 because these values are marked as saturated.
15) The resulting block is "12, −4, 10, 15, −5, −10, −8, 20".
16) Bits 3 and 6 are already marked as saturated and bits 4 and 8 are newly saturated. Therefore the bits are marked as follows—"X X S S X S X S".
17) The block is decoded by the turbo decoder as "101".
18) The CRC value for this block is "1". Therefore the block passes the CRC check.

The embodiments of the present invention can be implemented as software executing on generic hardware, as specialised hardware such as mobile wireless device controller chips, or as a combination of both hardware and software.

It will be appreciated that embodiments of the present invention can be implemented as a distributed processing system or as separate parts of the entire system disclosed.

One potential advantage of embodiments of the present invention is that, when blocks have been retransmitted, strongly received bits for one block are not degraded by weakly received incorrect bits from the other block.

Another potential advantage of embodiments of the present invention is that the memory to store bit values can be reduced without impacting on the decoder's ability to decode the block.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A controller for a communications device, comprising:
   a processor arranged for receiving a first data block and a second data block, each data block comprising a plurality of values, modifying at least one value of the first block by combination with a corresponding value of the second block except when the at least one value of the first block is marked as saturated and marking each modified value as saturated when the modified value is outside a defined range.

2. A controller as claimed in claim 1 wherein the modified value is marked as saturated when the modified value is outside the defined range by a defined threshold.

3. A controller as claimed in claim 1 wherein the values are digital values.

4. A controller as claimed in claim 1 including a receiver arranged for receiving the first and second data block in analogue form such that the first and second block comprises a plurality of analogue signals.

5. A controller as claimed in claim 1 including a memory for storing the first block in a buffer.

6. A controller as claimed in claim 5 wherein the memory is further arranged for storing the modified first block in the buffer.

7. A controller as claimed in claim 4 wherein the first block is received first by the receiver.

8. A controller as claimed in claim 2 including a digitizer arranged for converting each analogue signal into a digital value and marking each digital value as saturated when the digital value is outside a defined digital range.

9. A controller as claimed in claim 8 wherein the digital value is marked as saturated when the digital value is outside the defined digital range by a defined digital threshold.

10. A controller as claimed in claim 9 wherein the defined range and the defined digital range are the same, and wherein the defined threshold and the defined digital threshold are the same.

11. A controller as claimed in claim 1 including a decoder arranged for decoding the modified first block.

12. A controller as claimed in claim 11 wherein the decoder utilizes likelihood values to decode a data block.

13. A controller as claimed in claim 11 wherein the decoder is a turbo decoder.

14. A controller as claimed in claim 11 including a verification unit arranged for verifying the decoded modified first block.

15. A controller as claimed in claim 14 wherein the verification unit utilizes a CRC (Cyclic Redundancy Check) verification method.

16. A controller as claimed in claim 1 wherein each block is received from a separate transmission of the same data block.

17. A controller as claimed in claim 11 wherein the decoder is further arranged for decoding the first block.

18. A controller as claimed in claim 17 wherein the verification unit is further arranged for verifying the decoded first block.

19. A controller as claimed in claim 18 including a transmitter arranged for transmitting a request for retransmission of the first block when the verification unit fails verification of the decoded first block.

20. A controller as claimed in claim 19 wherein the second block is transmitted by a transmitting entity to the receiver in response to the request for retransmission of the first block.

21. A controller as claimed in claim 3 wherein a digital value is marked as saturated by setting a saturation flag assigned to that digital value.

22. A controller as claimed in claim 1 wherein the at least one value is marked as saturated by assigning the value beyond the limit of the range.

23. A device-implemented method of processing a first data block and a second data block, each data block comprising a plurality of values, including the steps of:
   (i) modifying, by an electronic device, at least one value of the first block by combination with a corresponding value of the second block except when the at least one value of the first block is marked as saturated; and
   (ii) marking, by an electronic device, each modified value as saturated when the combination of the modified value is outside a defined range.

24. A controller for a communications device, comprising:
   a receiver arranged for receiving a first data block and a second data block, each data block comprising a plurality of analogue signals;
   a digitizer arranged for converting each analogue signal into a digital value and marking each digital value as saturated when the digital value is outside a digital range; and a processor arranged for modifying at least one digital value of the first block by combination with a corresponding digital value of the second block except where the at least one digital value of the first block is marked as saturated and marking each modified value as saturated when the modified value is outside the defined range.

* * * * *